United States Patent [19]

Bruder et al.

[11] Patent Number: 4,481,985

[45] Date of Patent: Nov. 13, 1984

[54] APPARATUS AND METHOD FOR WEIGHING FLUENT MATERIAL

[75] Inventors: Stephen Bruder, Budd Lake; Philip Higby, Towaco; Edgar Roth, Dumont, all of N.J.

[73] Assignee: Lee Heydenreich, Essex Falls, N.J.

[21] Appl. No.: 469,426

[22] Filed: Feb. 24, 1983

[51] Int. Cl.$^3$ ............................................. B65B 1/04
[52] U.S. Cl. ....................................... 141/1; 141/83; 177/60; 177/255; 177/DIG. 3; 222/77
[58] Field of Search .................... 222/77; 177/DIG. 3, 177/60, 255; 141/83, 1-12, 250-284, 85-92, 37-82

[56] References Cited

U.S. PATENT DOCUMENTS 3,301,340  1/1967  Lau ........................................ 177/60
4,350,216  9/1982  Mavretic ...................... 177/DIG. 3

*Primary Examiner*—Houston S. Bell, Jr.
*Attorney, Agent, or Firm*—Bernard J. Murphy

[57] ABSTRACT

The apparatus of the invention comprises a fluent material-receiving chamber, and a frame from which the chamber is pendently supported. A load cell suspends the chamber from the frame, and transmits millivolt signals to an electronic control and display assembly where the signals translate to display indicia representative of weights of fluent material received by the chamber. The assembly, in response to the signals, displays the achievement of a threshold of a fluent material reception level, which is selective and predetermined, to halt further admittance of fluent material into the chamber, and displays an actual fluent material reception level, by the weight of the material. Flexure stabilizers are intercoupled between the chamber and the frame, to inhibit any displacement of the chamber from its vertical, pendent suspension. The method of the invention sets forth the procedural steps, in weighing fluent material, capable of practice by the inventive apparatus.

8 Claims, 5 Drawing Figures

APPARATUS AND METHOD FOR WEIGHING FLUENT MATERIAL

This invention pertains to apparatus and methods for weighing fluent material, and in particular to a novel apparatus and method which measure actual fluent material weights, and inhibit displacement of a fluent-material-receiving chamber from an optimum attitude, as by an offset loading of the chamber with material, to enable actual weight measurements.

Apparatus and methods for weighing fluent material which are already known to the technology are reasonably efficient, but they do have some limitations. The known apparatus and practices comprise the reception of fluent material by a pendent chamber which is suspended from a frame by a load cell. However, with the admittance of material into the chamber, even if done tangentially, the material can, and frequently will, load unevenly. This causes a displacement of the chamber from its optimum, vertical suspension, and gives a false reading of the material weight in the chamber. Further, the known apparatus and methods have sensors which monitor the increasing material weight and, when a predetermined threshold of material weight is reached, operate to halt further input of material. Almost never is a set-point, desired weight of material achieved, with these known equipments and procedures. Rather, it happens that either the admittance of fluent material is halted slightly too soon, and the weight is short, or more commonly, the admittance is halted too late, and the weight is greater than it is intended to be.

It is an object of this invention to set forth a novel apparatus for weighing fluent material which avoids the aforementioned limitations of the known equipments. It is further an object of this invention to disclose the novel steps in a method of weighing fluent material which, like the aforesaid inventive object, avoids the cited disadvantages of known methods. Our novel apparatus and methods comprise the display of true weights, and include the restraint of the materials-receiving chamber from displacement from its vertical suspension.

It is particularly an object of this invention to set forth apparatus for weighing fluent material comprising first means for defining a fluent-material-receiving chamber; said chamber having a first port formed therein for admitting fluent material therethrough and into said chamber; said chamber having a second port formed therein for discharging fluent material therethrough from said chamber; valving means coupled to said chamber operative for occluding and exposing said second port; second means defining a frame; and means coupled to said frame and to said chamber pendently supporting the latter from said frame; wherein said coupled supporting means comprises a load cell; and means interposed between said frame and said chamber for stabilizing said chamber in pendent support from said frame.

It is also an object of this invention to disclose a novel method of weighing fluent material, comprising the steps of providing a fluent-material-receiving chamber; providing a frame; pendently supporting the chamber in a given attitude from the frame by coupling the chamber to the frame through a load cell; admitting fluent material into the chamber; taking milli-volt output signals from the load cell; and translating the signals into indicia representative of the weight of the fluent material admitted into the chamber; wherein said supporting step comprises stabilizing the chamber, in its pendent support from said frame, displacement from said given attitude.

Further objects of this invention, as well as the novel features and steps thereof, will become more apparent by reference to the following description taken in conjunction with the accompanying figures, in which.

Figure 1:
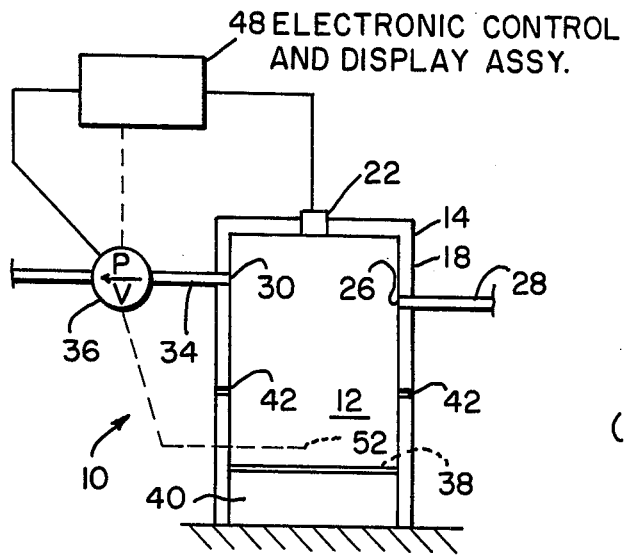
FIG. 1 is a schematic, line illustration of the novel apparatus, according to an embodiment thereof.
Figure 2A:
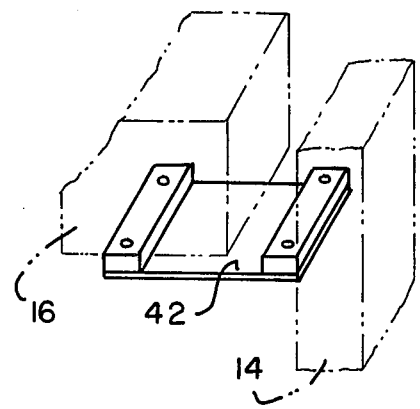
FIG. 2A is an isometric illustration of the flexure stabilizer for the appartus.
Figure 3:
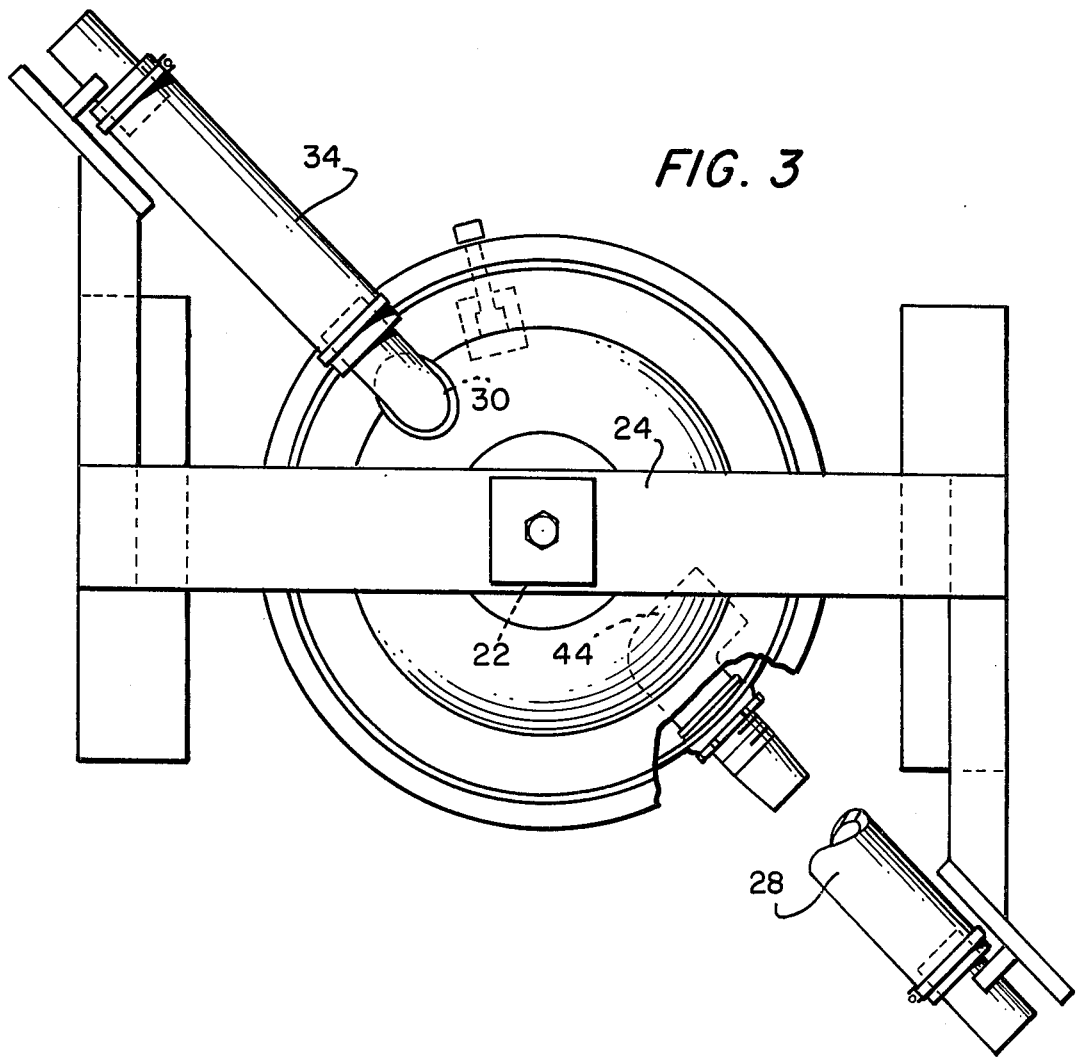
FIG. 3 is a plan view of the apparatus of FIG. 2.
Figure 2:
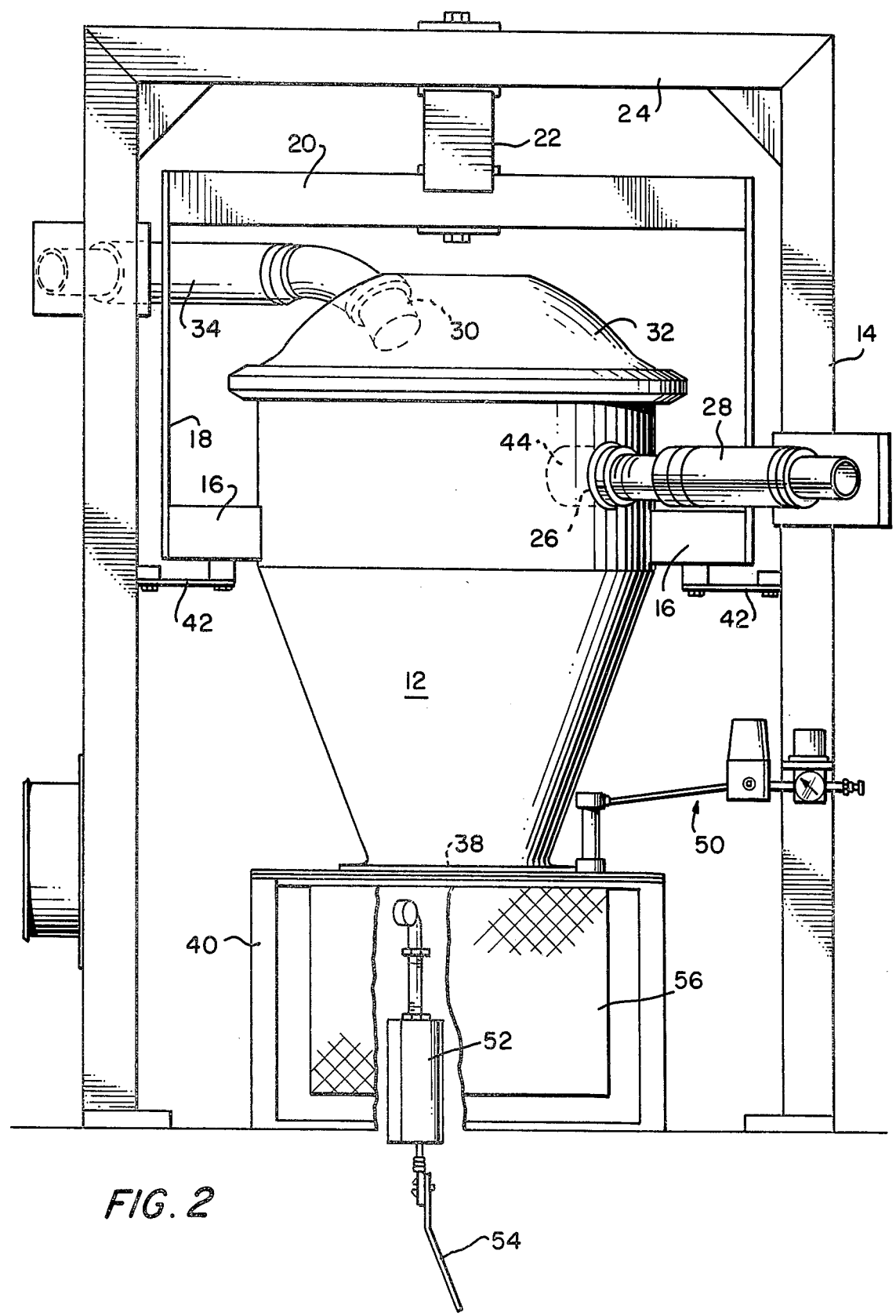
FIG. 2 is an elevational view of the fluent-material-receiving chamber and frame, of FIG. 1.
Figure 4:
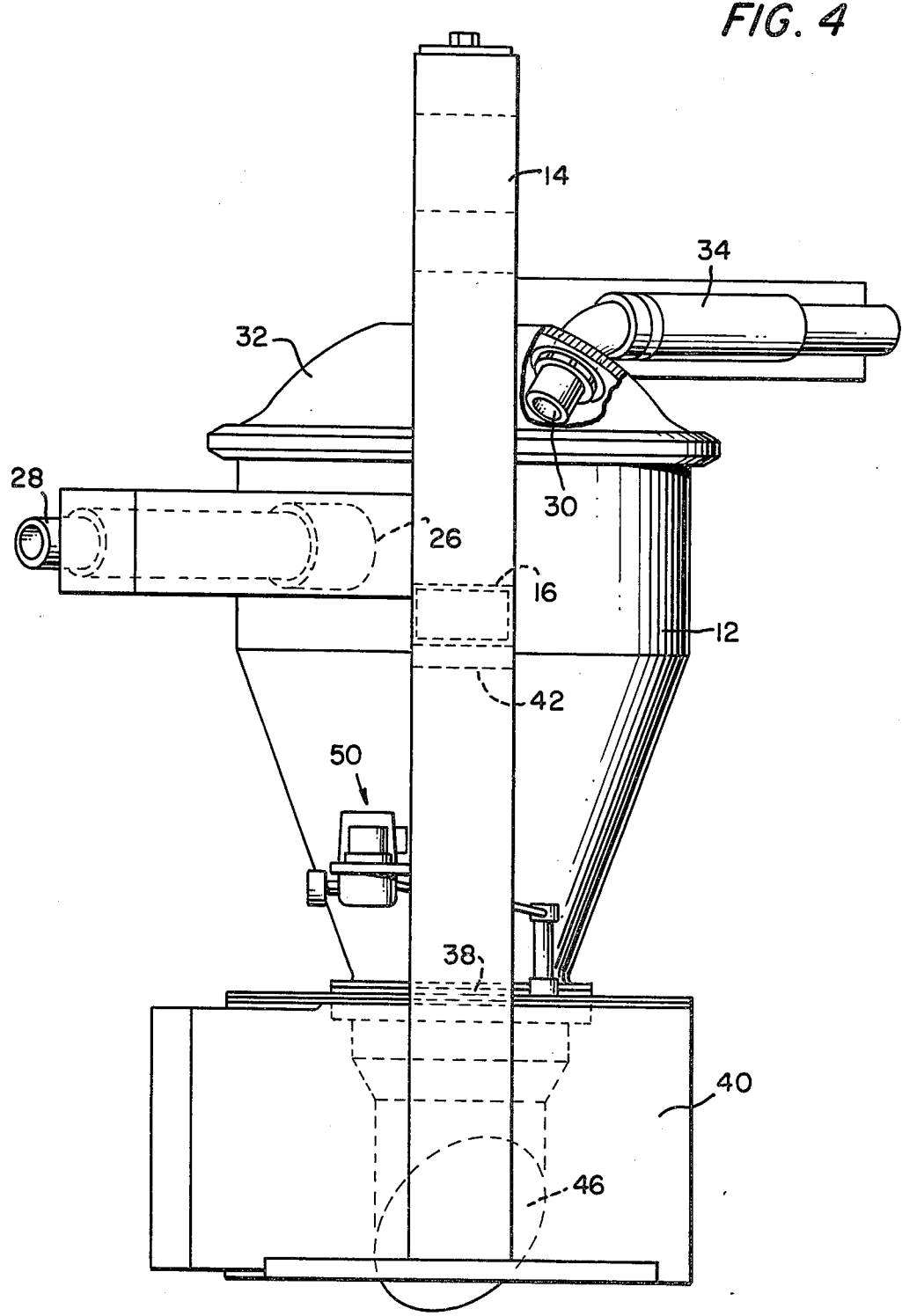
FIG. 4 is a side elevational view of the apparatus, taken from the right-hand side of FIG. 2.

As shown in the figures, the novel apparatus 10 for weighing fluent material, according to an embodiment of the invention, comprises a chamber 12 which is suspended in a main frame 14. Chamber 12 is bolted to limbs 16 which extend from a hanger frame 18, and the latter has a header 20 which is pendently coupled to a load cell 22. The latter is coupled to a header 24 of the main frame 14.

Chamber 12 has a port 26 to which is coupled a conduit 28 for admitting fluent material into the chamber. A further port 30, formed through the cover 32 of the chamber 12, receives another conduit 34. The latter defines a vacuum connection with a vacuum pump 36. In the lowermost portion of the chamber 12 is another port 38 or opening through which fluent material is discharged to a receiver (not shown).

The chamber 12 is suspended on a vertical axis over a platform 40 and is restrained against displacement from the axis. At each side of the chamber 12, below the limbs 16, is a flexure leaf 42. The leaves 42 accommodate a minute axial travel of the chamber 12, as fluent material loading therein strains the load cell 22. However, these leaves 42 inhibit any nutation, tilt or other disorientation of the chamber 12 from its optimum vertical suspension. An inlet pipe 44 disgorges fluent material from the conduit 28 into the chamber 12 in a tangential flow. Even so, the material can load in the chamber 12 unevenly, and the flexure leaves 42 hold the chamber substantially vertical in order that the load cell will not give a false reading of the weight of the material in the chamber.

A flapper valve assembly 46 opens and closes the lower port 38 in the chamber; it closes to collect material in the chamber 12, and opens to discharge the weighed material to the receiver. The vacuum provided by the pump 36 causes the valve assembly 46 to occlude the port 38, and upon the pump 36 being turned off, the valve assembly opens the port 38.

An electrode control and display assembly 48, which is electrically connected to both the pump 36 and the load cell 22 starts, stops and monitors operation of the apparatus 10. The aforesaid assembly is a proprietary device manufactured and sold by Foremost Machine Builders, Inc., of 23 Spielman Road (P.O. Box 644), Fairfield, N.J. 07006. Accordingly, while the details of this assembly 48 are not disclosed herein, the aforementioned company provides the assembly to the trade. What are disclosed herein, are the functions and operations of the assembly 48.

Assembly 48 has controls for establishing a set-point loading for the assembly 10 and for initiating assembly operation. By manipulation of the controls, the pump 36 is turned on to impress a vacuum in the chamber 12. As a result, the flapper valve assembly 46 is drawn closed, and fluent material is ingested into the chamber 12 via the conduit 28. The assembly 48 constantly monitors the fluent material weight, via the load cell 22, and as the weight comes upon the threshold of the predetermined and selective set-point loading, it turns off the pump 36. Consequently, the fluent material ingestion ceases. Thereupon, the assembly 48, in cooperation with the load cell 22, senses the actual weight of the fluent material confined within the chamber 12, and presents a visual, digital display thereof. Next the assembly 48 operates a flapper valve assembly control 50 to open the port 38 and discharge the fluent material to the receiver, and displays an "accumulation inventory" of the summing of discharged material. On occasion the receiver will be too full to accept fluent material discharge from the port 38. Now, in order to sense this condition, a level switch 52 is supported within the platform 40. The switch 52 has a spatula-like limb 54 which is displaced laterally, by a too full receiver. The switch 52 is connected to assembly 48, and the latter has means responsive to such limb displacement to bring the assembly 10 operation to a halt. Circumscribing the level switch 52, within the platform 40, is a filter 56. The latter is disposed there to entrap loose particles of fluent material. The aforementioned proprietary assembly 48 includes means for automatically blowing down the filter 56 following each fluent material discharge of the apparatus 10. Such means comprise means for reversing the pump 36 and causing the latter to expel compressed air through the chamber 12 and through the filter 56 to dislodge the particles of material adhering thereto.

While we have described our invention in connection with a specific embodiment thereof, and specific steps of method, it is to be clearly understood that this is done only by way of example and not as a limitation to the scope of our invention as set forth in the objects thereof and in the appended claims.

We claim:

1. Apparatus for weighing fluent material, comprising:
   first means defining a fluent-material-receiving chamber;
   said chamber having a first port formed therein for admitting fluent material therethrough and into said chamber;
   said chamber having a second port formed therein for discharging fluent material therethrough and into said chamber;
   valving means coupled to said chamber operative for occluding and exposing said second port;
   second means defining a main frame;
   third means defining a hanger frame;
   means fixing said chamber to said hanger frame; and
   a single support element coupled to said hanger frame and to said main frame pendently supporting said hanger frame from said main frame; wherein
   said single support element comprises a load cell; and
   a single pair of flexure leaves interposed between said hanger frame and said main frame for stabilizing said chamber and hanger frame in pendent support from said main frame.

2. Apparatus for weighing fluent material, according to claim 1, wherein:
   said chamber further has a third port formed therein for communicating thereto a sub-atmospheric pressure.

3. Apparatus for weighing fluent material, according to claim 1, wherein:
   said flexure leaves comprise means for resisting displacement of said chamber from a pendent attitude thereof.

4. Apparatus for weighing fluent material, according to claim 1, wherein:
   said load cell pendently supports said hanger frame from said main frame on a vertical axis; and
   said flexure leaves comprise means for inhibiting displacement of said chamber from said axis.

5. Apparatus for weighing fluent material, according to claim 1, further including:
   an electronic control and display assembly;
   said assembly having means coupled to said load cell for receiving millivolt output signals from said load cell, and further having means responsive to said signals for displaying indicia representative of (a) a selective and predetermined, fluent-material-reception-level threshold, and (b) actual fluent material reception by said chamber, by the weight thereof.

6. Apparatus for weighing fluent material, according to claim 5, wherein
   said chamber further has a third port formed therein for communicating thereto a sub-atmospheric pressure; and further including
   a conduit coupled to, and opening onto said third port; and
   an operative source of sub-atmospheric pressure; wherein
   said assembly further has means coupled to said source for operating the latter.

7. A method of weighing fluent material, comprising the steps of:
   providing a fluent-material-receiving chamber;
   providing a main frame;
   providing a hanger frame;
   providing a single pendent support for the hanger frame by pendently supporting the hanger frame from the main frame by coupling the hanger frame to the main frame through a load cell;
   interposing flexure leaves between said hanger frame and said main frame to stabilize the pendent support of the hanger frame;
   admitting fluent material into the chamber;
   taking milli-volt output signals from the load cell; and
   translating the signals into indicia representative of the weight of the fluent material admitted into the chamber.

8. A method of weighing fluent material, according to claim 7, wherein:
   said signals translating step comprises displaying indicia representative of (a) a threshold level of reception, by the chamber, of a selective and predetermined fluent material weight, and (b) an actual level of reception, by the chamber, of fluent material weight.

* * * * *